US006325912B1

(12) United States Patent
Hirokawa et al.

(10) Patent No.: US 6,325,912 B1
(45) Date of Patent: Dec. 4, 2001

(54) APPARATUS AND METHOD FOR ELECTROLYTIC TREATMENT

(75) Inventors: Tsuyoshi Hirokawa; Toru Yamazaki, both of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/511,990

(22) Filed: Feb. 24, 2000

(30) Foreign Application Priority Data

Feb. 24, 1999 (JP) ..................................... 11-046864

(51) Int. Cl.[7] ............................ C25F 3/04; B01D 17/06

(52) U.S. Cl. ......................... 205/652; 205/658; 205/704; 204/206

(58) Field of Search ............................ 204/206; 205/652, 205/138, 654, 704, 658

(56) References Cited

U.S. PATENT DOCUMENTS 4,747,923 * 5/1988 Oda .................................... 204/206
4,929,326 * 5/1990 Uesugi et al. ...................... 204/206
5,066,370 * 11/1991 Andreshak et al. ............ 204/211 X
5,094,733 * 3/1992 Kaneko et al. ..................... 204/206

FOREIGN PATENT DOCUMENTS 387 750 9/1990 (EP) .
475 026 3/1992 (EP) .

* cited by examiner

*Primary Examiner*—Donald R. Valentine
(74) *Attorney, Agent, or Firm*—Sughrue, Mion, Zinn, Macpeak & Seas, PLLC

(57) ABSTRACT

This invention provides an apparatus and a method capable of electrolyzing a metal web at a high treating speed and high current density without a problem of uneven treatment, which a metal web is wound, arc-shaped electrodes allocated on the outside of the drum roller concentrically with a space, and an electrolytic solution put in the space, wherein the drum roller is made movable in the vertical direction, and a method using the apparatus.

7 Claims, 2 Drawing Sheets

APPARATUS AND METHOD FOR ELECTROLYTIC TREATMENT

BACKGROUND OF THE INVENTION

This invention relates to an apparatus and method for electrolytic treatment which comprises etching a metal web electrolytically using alternating waveform current continuously, and particularly, relates to an apparatus and method for electrolytic treatment suitable for electrolytic etching of aluminum web during manufacturing a support for planographic printing plate.

Electrolytic etching of a surface of aluminum, iron or the like is widely utilized, and alternating waveform current is generally used due to required quality and the improvement in reaction efficiency. For example, Japanese Patent KOKOKU 56-19280 discloses an electrolytic etching treatment which can provide excellent roughening as a support for an offset printing plate by using an alternating waveform current impressed so that the electric voltage at anode is made greater than the electric voltage at cathode in electrolytic roughening of an aluminum plate.

In general, electrolytic etching is carried out at a current density of 10 to 100 A/dm$^2$ in an acidic electrolytic solution, such as 1 to 5% nitric acid or hydrochloric acid. Upon treating electrolytically an aluminum plate as the metal web, $Al \rightarrow Al^{3+}+3e$ dissolution reaction occurs at an anode period, and $H^{+}+e \rightarrow (1/2)H_2 \uparrow$ hydrogen gas generation reaction and $Al^{3+}+3OH \rightarrow Al(OH)_3$ aluminum hydroxide smut formation reaction occur simultaneously at a cathode period on the aluminum plate.

These reactions occur alternately according to the frequency of power supply, and, in general, it is possible to obtain a required roughened surface by adjusting these fundamental reactions by controlling electrolytic conditions, such as the type and concentration of electrolytic solution, temperature conditions, current density and charged quantity of electricity.

Hereupon, in the case of using alternating waveform current, there are differences between the treatment initiating part by the dissolution reaction and the terminating part caused by the current cycle on entering a metal web into an electrolytic bath and on going out of the bath, and shadow unevenness (uneven treatment) occurs in the cross direction to the traveling direction of the metal web. The uneven treatment generates according to the frequency of a power supply. For example, in the case of a treating speed of 50 m/min and a frequency of power supply of 60 Hz, the uneven treatment generates at an interval (pitch) of 1.39 cm in the longitudinal direction of the metal web. In view of massproduction, a higher treating speed and a higher current density treating speed and a higher current density treatment are desired. In the case of high strength aluminum support containing manganese or the like which recently increases, there is a tendency to manufacture a high quality support for planographic printing plate by lowering frequency.

On the other hand, the degree of the above mentioned ununiformity according to the frequency of power supply becomes stronger by higher treating speed, higher current density or lower frequency due to its generation mechanism.

In this regard, Japanese Patent KOKAI 1-230800 discloses an electrolytic apparatus which can remove the uneven treatment by providing low current density zones at the front end and rear end of an electrode, and making the remaining portion a constant current density zone. Japanese Patent KOKAI 4-289200 discloses a roughening method using a power supply frequency of 1 to 30 Hz.

However, according to the conventional methods mentional above, the uneven treatment according to the frequency cannot be removed entirely in the case of high treating speed, high current density or variation of electrolytic solution conditions.

SUMMARY OF THE INVENTION

An object of the invention is to provide an electrolytic treatment apparatus and an electrolytic treatment method which remove the uneven treatment according to the frequency and can achieve high treating speed and high current density treatment. The inventors investigated eagerly as to the uneven treatment generated on metal web, and as a result, they found that the uneven treatment occurs particularly strongly at the upstream end of the rear electrode in the traveling direction of the metal web in an indirect electric power supply cell. They further found that the uneven treatment is generated caused by the existence of untreating zone between the electrodes, and by a very high current density at that part caused by the electric resistance of the metal web.

Thus, the present invention provides a method for electrolytic treatment which comprises passing a metal web through an apparatus for electrolytic treatment which comprises a drum roller around which a metal web is wound, arc-shaped electrodes allocated on the outside of the drum roller concentrically with a space, and an electrolytic solution put in the space, and electrolyzing the metal web by applying an electric current to the electrodes, wherein the electrolyzing is carried out in a state that the drum roller has been moved upward from the concentric point.

By making the drum roller movable, the current density at the ends of the electrodes can be controlled so as to become optimum. When the drum roller is moved upward from the concentrical point, the distance from the ends of electrodes is lengthened to decrease the current density around the end portions of electrodes. The above ends are produced by separating an electrode. A suitable moving range is 10 to 100%, preferably 10 to 40%, more preferably 20 to 40% of the distance between the drum roller and the arc-shaped electrodes upon being located concentrically.

Figure 1:
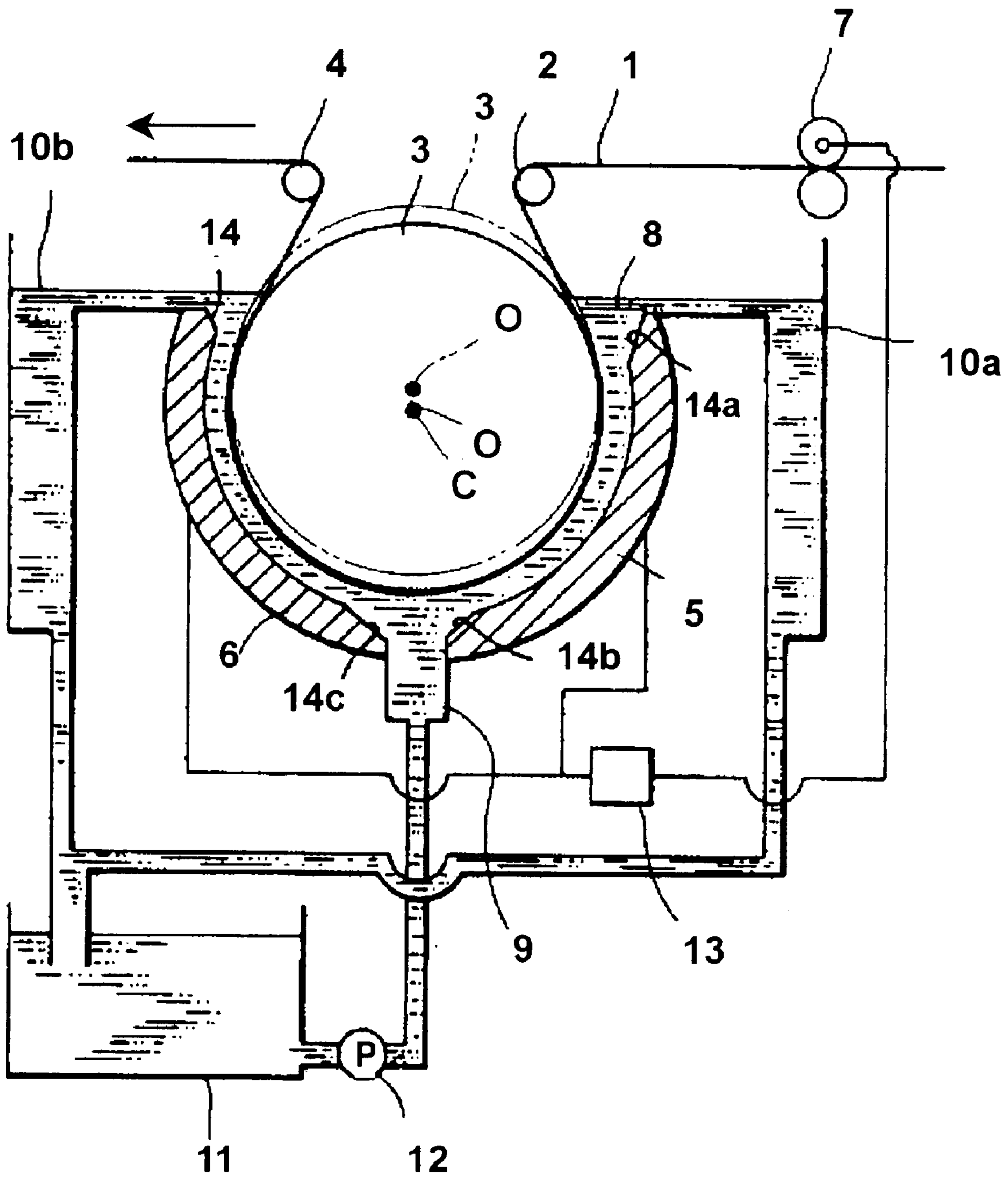
FIG. 1 is a schematic section of an apparatus for electrolytic treatment which embodies the invention.

1 . . . Metal web
2 . . . Pass roller
3 . . . Drum roller
4 . . . Pass roller
5, 6 . . . Electrode
7 . . . Electric supplier roller
8 . . . Electrolytic solution
9 . . . Supply port
10*a*, 10*b* . . . Discharge portion
11 . . . Circulation tank
12 . . . Pump
13 . . . Power supply
14, 14*b*, 14*c*, 14*d* . . . Cut off portion
O . . . Center of drum roller
C . . . Center of electrodes

DESCRIPTION OF THE PREFERRED EMBODIMENTS AND EXAMPLES

An apparatus for electrolytic treatment is illustrated in FIG. 1 which comprises a drum roller 3 and electrodes 5, 6 concentrically provided with the drum roller 3 on the outside thereof. That is, the distance between the drum roller 3 and each electrode 5, 6 is kept constant except both ends, and set at a distance selected in the range of 5 to 50 mm.

The drum roller 3 is movable vertically to transfer the central point O upward from the central point C of the electrodes 5, 6. That is, in the state that the central point O of the drum roller 3 is consistent with the central point C of the electrodes 5, 6, the distance between the circumferential face of the drum roller 3 and the surface of the electrodes 5, 6 is kept constant, as shown by a full line in FIG. 1. On the other hand, when the drum roller 3 is moved upward, the lower the position of the electrodes is, the longer the distance between the circumferential face of the drum roller 3 and the surface of the electrodes 5, 6 is. The distance is the greatest at the cut off portions 14*b*, 14*c*.

Both ends 14*a*, 14*b*, 14*c*, 14*d* (cut off portion) of each electrode 5, 6 is cut off obliquely so as to leave the surface of the drum roller 3 gradually to form a low current density zone. A metal web 1 enters horizontally from the right side in the figure, and after passing nip rollers containing an electric supplier roller 7, turns downward by a pass roller 2. The electric supplier roller 7 is driven at the same speed as the traveling speed of the metal web 1. The metal web 1 is wound around the drum roller 3, while electric treatment is carried out. Then, the metal web 1 leaves the drum roller 3, turns to horizontal direction by a pass roller 4, and further travels.

An electrolytic solution 8 is put in a circulation tank 11, and supplied from a supply port 9 located at the bottom of the electrolytic cell to fill the space between the drum roller 3 and the electrodes 5, 6 by a pump 12. The electrolytic solution 8 overflows from the upper edge of each electrode 5, 6, and returns to the circulation tank 11 through the discharge portion 10*a*, 10*b*.

Alternating waveform current is supplied from an alternating waveform current power supply 13. One output terminal of the power supply 13 is connected to the electric supplier roller 7, and the other output terminal is connected to the electrodes 5, 6. The power supply 13 is provided with a frequency controller as the frequency-variable means, and the frequency of the output alternating waveform current can be set arbitrarily at an interval of 0.1 Hz.

Using the above electrolytic treatment apparatus, electrolytic etching of an aluminum web was carried out.

The electrolytic conditions are as follows:

| | |
|---|---|
| Aluminum web width: | 1000 mm |
| Treating speed: | 60 m/min |
| Type of electrolytic solution: | 1% of nitric acid |
| Temperature: | 40° C. |
| Mean current density: | 60 A/dm$^2$ |
| Frequency: | 60.1–60.5 Hz |

Distance between drum roller (Al web) and electrodes: 15 mm

The moved length in the upward direction of the drum roller was 10%, 20% and 40% of the distance between the drum roller (Al web) and the electrode upon they were allocated concentrically.

Figure 2:
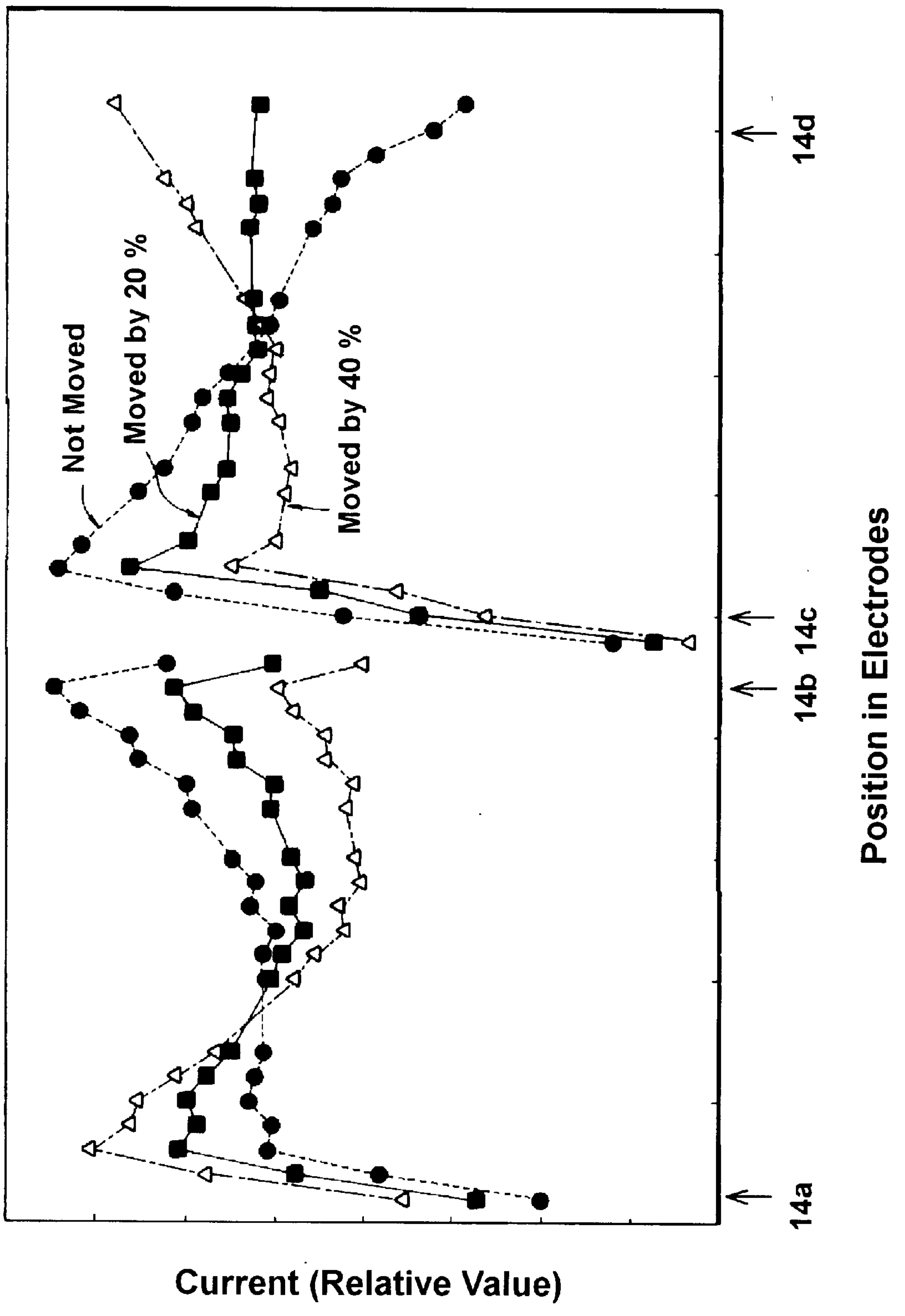
FIG. 2 is a graph indicating variation of current with the position of electrodes and moved distance of the drum roller.

The current variation with the position of the electrodes at each moved position of the drum roller is shown in FIG. 2. In the figure, ● indicated not moved, ■ indicates moved by 20%, and Δ indicates moved by 40%, respectively. The results in FIG. 2 show that current value is decreased with increasing the moved length of drum roller at the cut off portions 14*b*, 14*c*.

The occurrence of uneven treatment is summarized in Table 1.

TABLE 1

| Frequency | Movement of Drum Roller | | | |
|---|---|---|---|---|
| (Hz) | 0% | 10% | 20% | 40% |
| 60.1 | Δ | ○Δ | ○ | ○ |
| 60.3 | ○Δ | ○ | ○ | ○ |
| 60.5 | Δ | ○Δ | ○ | ○ |

Δ . . . Generated
○Δ . . . Slightly generated
○ . . . Not or almost not generated

What is claimed is:

1. An apparatus for electrolytic treatment of a metal web which comprises a drum roller and arc-shaped electrodes allocated on the outside of the drum roller concentrically with a space for receiving an electrolytic solution, wherein the drum roller is movable in the vertical direction, the drum roller and the arc-shaped electrodes are arranged with a distance of 5 to 50 mm, the movable range of the drum roller is at least up to 100% of the distance in the upward direction, and during electrolytic treatment the metal web is wound around the drum roller so as to contact the electrolytic solution.

2. The apparatus of claim 1 wherein the metal web is an aluminum web.

3. A method for electrolytic treatment which comprises passing a metal web through an apparatus for electrolytic treatment which comprises a drum roller around which a metal web is wound, arc-shaped electrodes allocated on the outside of the drum roller concentrically with a space, and an electrolytic solution put in the space, and electrolyzing the metal web by applying an electric current to the electrodes, wherein the electrolyzing is carried out in a state that the drum roller has been moved upward from the concentric point, the drum roller and the arc-shaped electrodes are arranged with a distance of 5 to 50 mm, and the moved distance of the drum roller is 10 to 100% of the distance between the drum roller and the arc-shaped electrodes in the upward direction.

4. The method of claim 3 wherein the moved distance is 10 to 40%.

5. The method of claim 3 wherein the moved distance is 20 to 40%.

6. An apparatus for electrolytic treatment of a metal web which comprises a drum roller, arc-shaped electrodes allocated on the outside of the drum roller concentrically with a space for receiving an electrolytic solution, and an alternating waveform current power supply, wherein the drum roller is movable in the vertical direction, during electrolytic treatment the metal web is wound around the drum roller so as to contact the electrolytic solution, and said alternating current is applied across the metal web and the arc-shaped electrodes.

7. A method for electrolytic treatment which comprises passing a metal web through an apparatus for electrolytic treatment which comprises a drum roller around which a metal web is wound, arc-shaped electrodes allocated on the outside of the drum roller concentrically with a space, an electrolytic solution put in the space, and an alternating waveform current power supply, and electrolyzing the metal web by applying an alternating current across the metal web and the arc-shaped electrodes, wherein the electrolyzing is carried out in a state that the drum roller has been moved upward from the concentric point.

* * * * *